US010628408B2

(12) United States Patent
Jin et al.

(10) Patent No.: US 10,628,408 B2
(45) Date of Patent: Apr. 21, 2020

(54) METHOD, APPARATUS, AND COMPUTER PROGRAM PRODUCT FOR DIGITAL CONTENT AUDITING AND RETENTION IN A GROUP BASED COMMUNICATION REPOSITORY

(71) Applicant: Slack Technologies, Inc., San Francisco, CA (US)

(72) Inventors: Brenda Jin, San Francisco, CA (US); Britton Jamison, San Francisco, CA (US)

(73) Assignee: SLACK TECHNOLOGIES, INC., San Francisco, CA (US)

(*) Notice: Subject to any disclaimer, the term of this patent is extended or adjusted under 35 U.S.C. 154(b) by 182 days.

(21) Appl. No.: 15/655,652

(22) Filed: Jul. 20, 2017

(65) Prior Publication Data

US 2019/0026328 A1    Jan. 24, 2019

(51) Int. Cl.
*G06F 16/23* (2019.01)
*H04L 29/08* (2006.01)
*H04L 29/06* (2006.01)

(52) U.S. Cl.
CPC ........ *G06F 16/2365* (2019.01); *H04L 63/083* (2013.01); *H04L 63/104* (2013.01);
(Continued)

(58) Field of Classification Search
CPC .......... G06F 16/2365; G06F 17/30371; G06F 21/00; G06F 21/10; G06F 21/56;
(Continued)

(56) References Cited

U.S. PATENT DOCUMENTS 8,065,739 B1 * 11/2011 Bruening ............ G06F 21/6227
704/2
9,009,834 B1 *  4/2015 Ren ..................... G06F 21/10
709/224
(Continued)

OTHER PUBLICATIONS

International Search Report and Written Opinion for corresponding International Application No. PCT/US2018/043091, dated Sep. 26, 2018, 8 pages.
(Continued)

*Primary Examiner* — Thanhnga B Truong
(74) *Attorney, Agent, or Firm* — Alston & Bird LLP

(57) ABSTRACT

Embodiments of the present disclosure provide methods, systems, apparatuses, and computer program products for digital content auditing in a group based communication repository, where the group based communication repository comprises a plurality of enterprise-based digital content objects organized among a plurality of group-based communication channels. In one embodiment, a computing entity or apparatus is configured to receive an enterprise audit request, where the enterprise audit request comprises an audit credential and digital content object retrieval parameters. The apparatus is further configured to determine if the audit credential satisfies an enterprise authentication protocol. In circumstances where the audit credential satisfies the enterprise authentication protocol, the apparatus is configured to retrieve and output digital content objects based on the digital content object retrieval parameters, receive a violating digital content object identifier, and replace a violating digital content object with a temporary digital content object based on the violating digital content object identifier.

23 Claims, 6 Drawing Sheets

(52) U.S. Cl.
CPC .............. *H04L 67/06* (2013.01); *H04L 67/22* (2013.01); *H04L 63/1425* (2013.01); *H04L 67/146* (2013.01); *H04L 67/306* (2013.01)

(58) Field of Classification Search
CPC .. G06F 21/566; G06F 21/554; G06F 21/6209; H04L 63/083; H04L 67/22; H04L 67/146; H04L 63/145; H04L 63/104; H04L 67/06; G06Q 30/0277
See application file for complete search history.

(56) References Cited

U.S. PATENT DOCUMENTS

| | | | |
|---|---|---|---|
| 2009/0119354 | A1 | 5/2009 | Stuart et al. |
| 2016/0119679 | A1 | 4/2016 | Randall et al. |
| 2016/0275303 | A1 | 9/2016 | Narayanaswamy et al. |
| 2018/0198683 | A1* | 7/2018 | Erb .................... H04L 41/0893 |

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
Rebecca Walberg, "Email biggest office waste of time: survey", National Post, at FP10, LexisNexis, https://advance.lexis.com/api/permalink/96268e3f-26ad-48ac-a98f-6c39804ebded/?context=1000516, (dated Mar. 4, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Mike Issac, "Slack, a Start-Up With an App to Foster Business Collaboration, is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014, 7:03 PM), 2 pages.
Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.
Internet Relay Chat, Wikipedia, , [online][retrieved May 30, 2019]. Retrieved from the Internet: <URL: https://en.wikipedia.org/wiki/Internet_Relay_Chat>. (dated May 28, 2019) 17 pages.
Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience!, (2019) 13 pages.
"Die, Email, Die! A Flickr Cofounder Aims to Cut Us all Some Slack", Readwriteweb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.
Matsumoto, T. et al., "Chocoa Communicator—A New Communication System Based on Awareness and Text Communications—", Fujitsu Sci. Tech. J., 36, 2, (Dec. 2000) 154-161.

\* cited by examiner

METHOD, APPARATUS, AND COMPUTER PROGRAM PRODUCT FOR DIGITAL CONTENT AUDITING AND RETENTION IN A GROUP BASED COMMUNICATION REPOSITORY

BACKGROUND

An enterprise may support communication and collaboration among users across the enterprise. Data retention as well as ensuring storage of compliant data within a group based communication repository associated with the enterprise is an important and complex security challenge. Applicant has identified a number of deficiencies and problems associated with digital content auditing and retention in a group based communication system. Through applied effort, ingenuity, and innovation, many of these identified problems have been solved by developing solutions that are included in embodiments of the present disclosure, many examples of which are described in detail herein.

BRIEF SUMMARY

This specification relates to digital content auditing in a group-based communication repository, where the group-based communication repository comprises a plurality of enterprise-based digital content objects organized among a plurality of group-based communication channels. In one embodiment, a computing entity or apparatus is configured to receive an enterprise audit request, where the enterprise audit request comprises an audit credential and digital content object retrieval parameters. The apparatus is further configured to determine if the audit credential satisfies an enterprise authentication protocol. In circumstances where the audit credential satisfies the enterprise authentication protocol, the apparatus is configured to retrieve and output digital content objects based on the digital content object retrieval parameters, receive a violating digital content object identifier, and replace a violating digital content object with a temporary digital content object based on the violating digital content object identifier.

The apparatus is optionally additionally configured to receive a compliance violation instruction. In response to the compliance violation instruction, the apparatus is configured to replace the temporary digital content object with a permanent replacement digital content object, delete any secondary digital content objects associated with the violating digital content object, and transmit deletion notifications to a violating digital content object author and any authors of the secondary digital content objects.

The apparatus is optionally additionally configured to receive a compliance non-violation instruction. In response to the compliance non-violation instruction, the apparatus is configured to remove the temporary digital content object and restore the violating digital content object.

Other embodiments include corresponding systems, methods, and computer programs, configured to perform the operations of the apparatus, encoded on computer storage devices. These and other embodiments can each optionally include one or more of the following features: the retrieval parameters comprise a group-based communication channel identifier, wherein only those objects stored in association with the group-based channel identifier are retrieved and output; the retrieval parameters comprise a group-based communication group identifier, wherein only those objects stored in association with channels in association with the group-based channel group are retrieved and output; the violating digital content object is moved to a private group-based communication channel for violating digital content objects; the retrieval parameters comprise a filter flag, wherein the filter flag is one or more of date, time, files, messages, or all.

This specification further relates to digital content retention in a group based communication repository, where the group based communication repository comprises a plurality of enterprise-based digital content objects organized among a plurality of group-based communication channels. In one embodiment, a computing entity or apparatus is configured to receive an enterprise data retention request, where the enterprise data retention request comprising a retention credential and digital content object retrieval criteria. The apparatus is further configured to determine if the digital content object retention credential satisfies an enterprise authentication protocol. In circumstances where the retention credential satisfies the enterprise authentication protocol, the apparatus is configured to retrieve and output digital content objects stored within the group based communication repository based on the digital content object retrieval criteria.

Other embodiments include corresponding systems, methods, and computer programs, configured to perform the operations of the apparatus, encoded on computer storage devices. These and other embodiments can each optionally include one or more of the following features: monitoring the group based communication repository for newly submitted digital content objects that match the digital content object retrieval criteria; automatically and electronically notifying an author of a retention-flagged digital content object that the retention-flagged digital content object is subject to a retention request.

Other embodiments can each optionally include one or more of preventing a client device from deleting a retention-flagged digital content object that is associated with a do not delete flag; preventing a client device from making changes to a retention-flagged digital content object that is associated with a do not edit flag; preventing a client device from making changes to a retention-flagged digital content object that is associated with a do not edit flag after expiration of an edit window, where the edit window is a duration of network time starting from a creation of the retention-flagged digital content object.

Other embodiments can each optionally include one or more of the following: the digital content object retrieval criteria comprises a group-based communication channel identifier; the digital content object retrieval criteria comprises a group-based communication group identifier; the digital content object retrieval criteria comprises a filter flag, wherein the filter flag is one or more of date, time, files, messages, or all.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
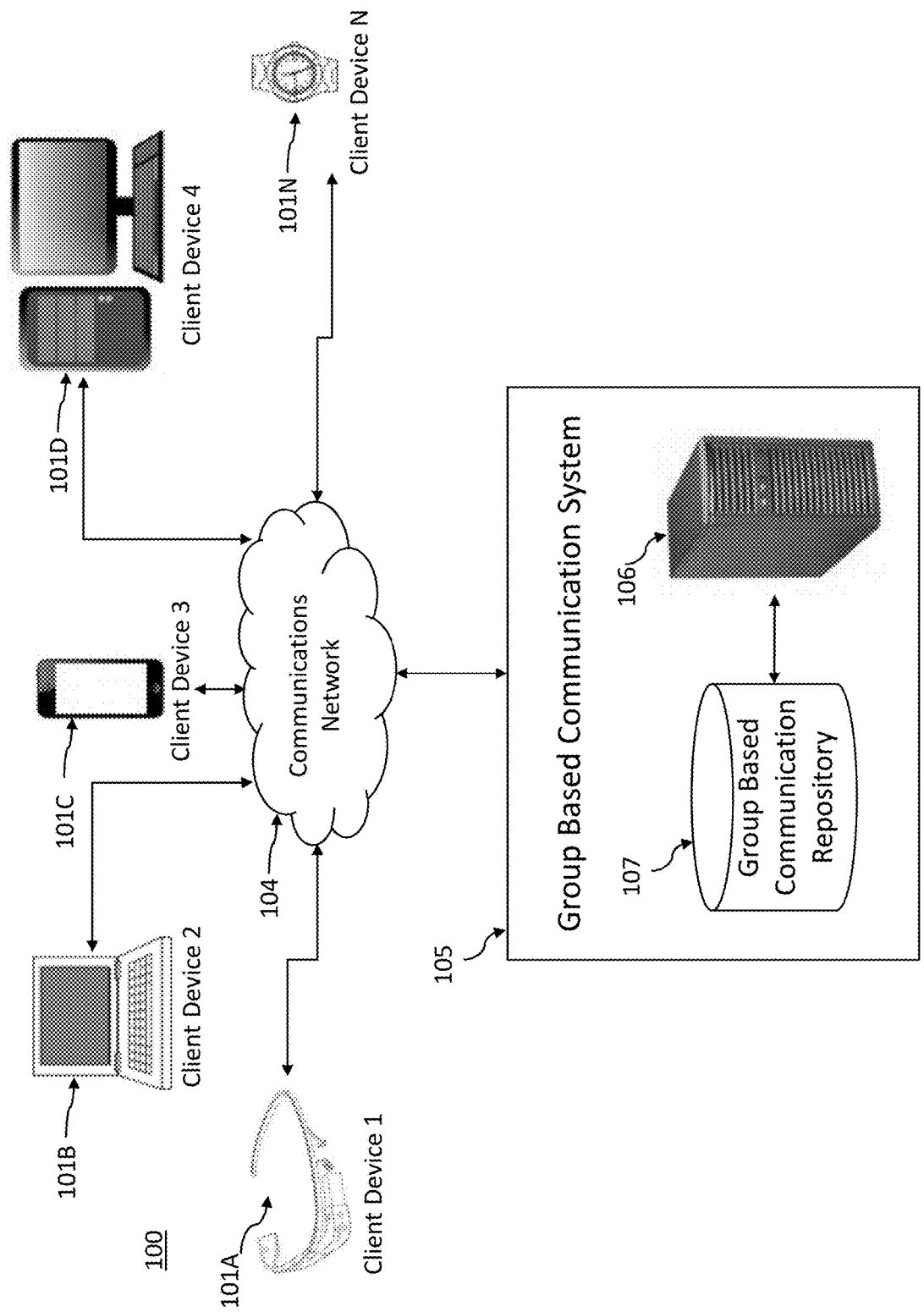
Figure 2:
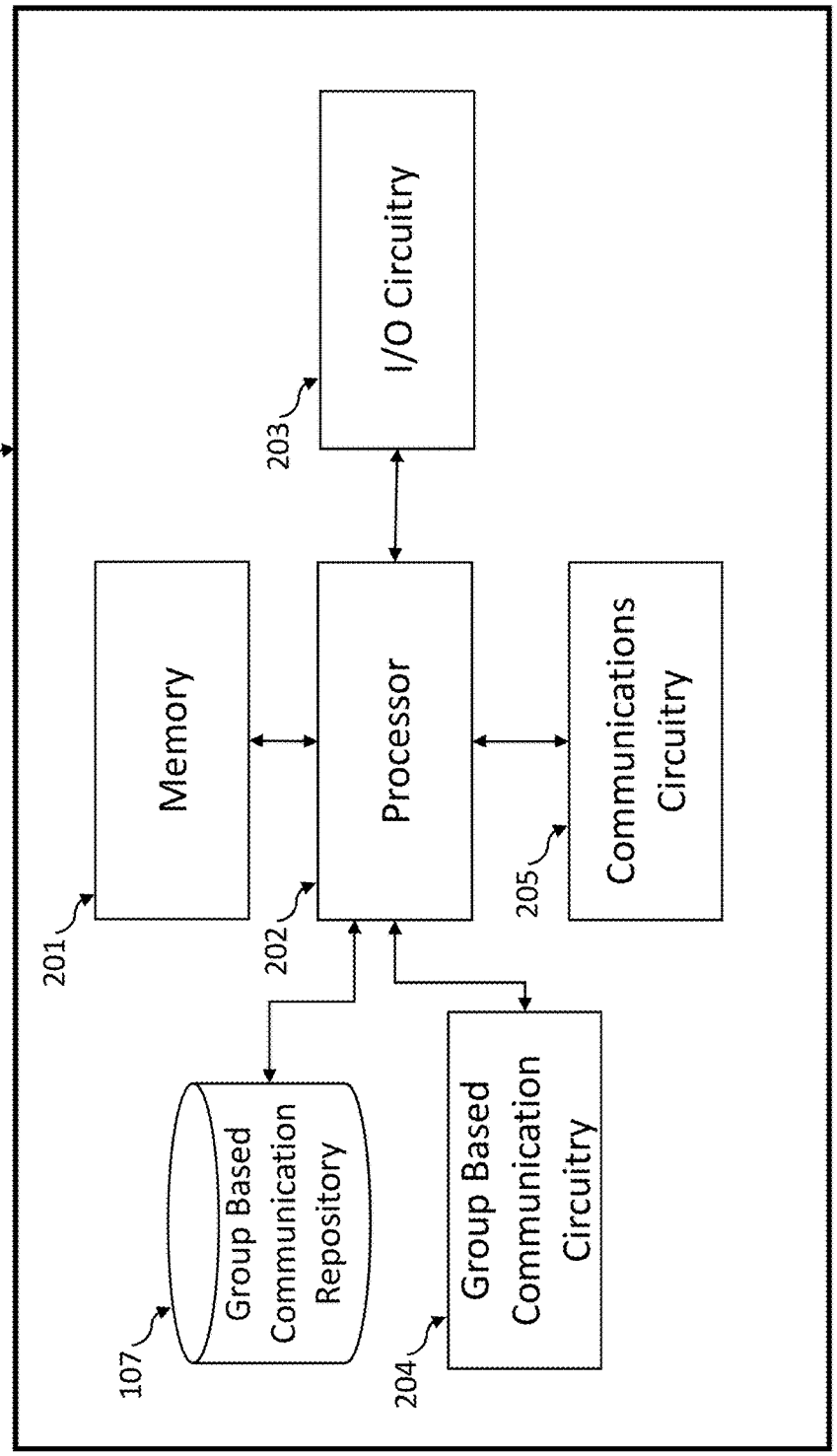
Figure 3A:
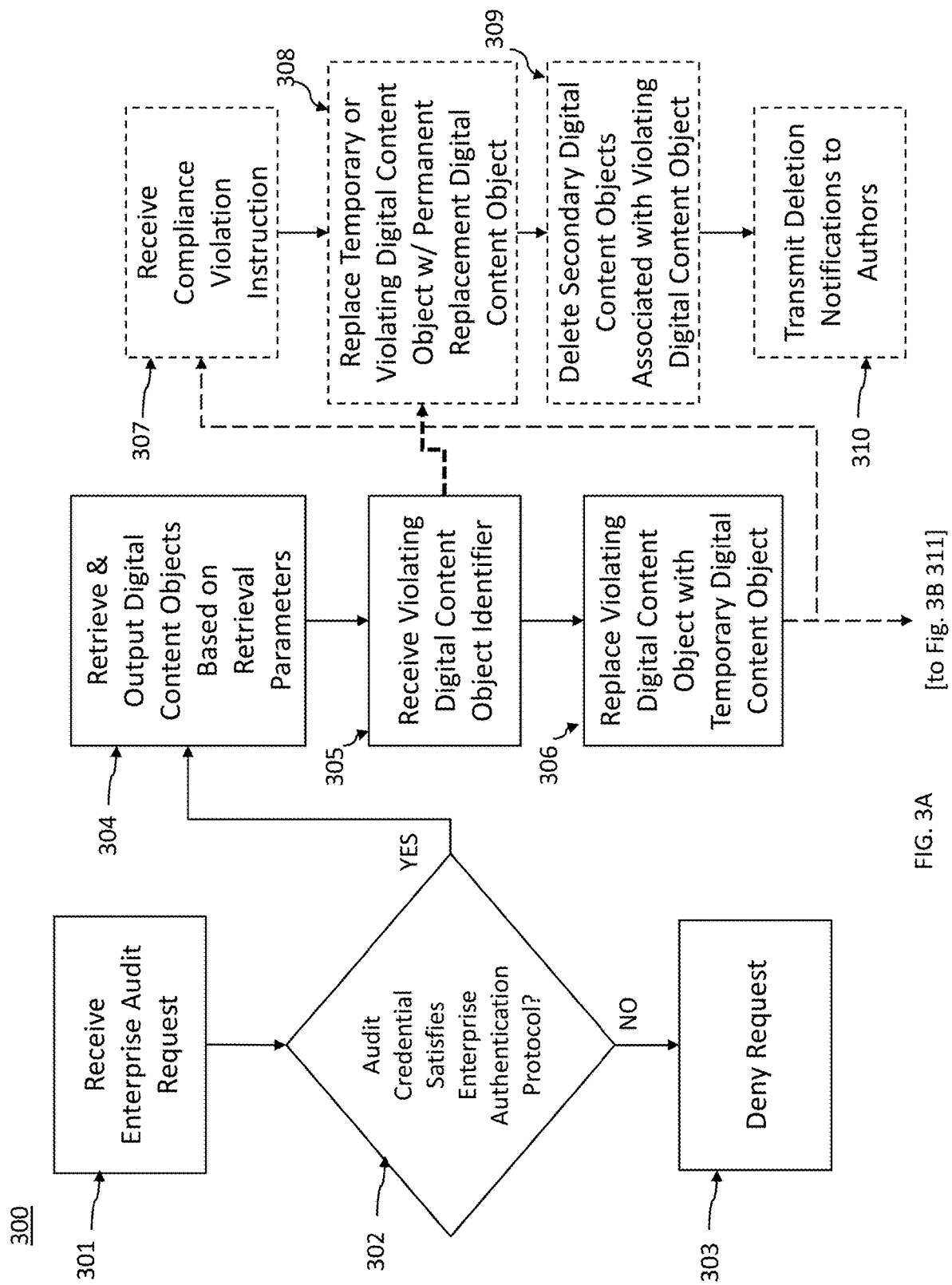
Figure 3B:
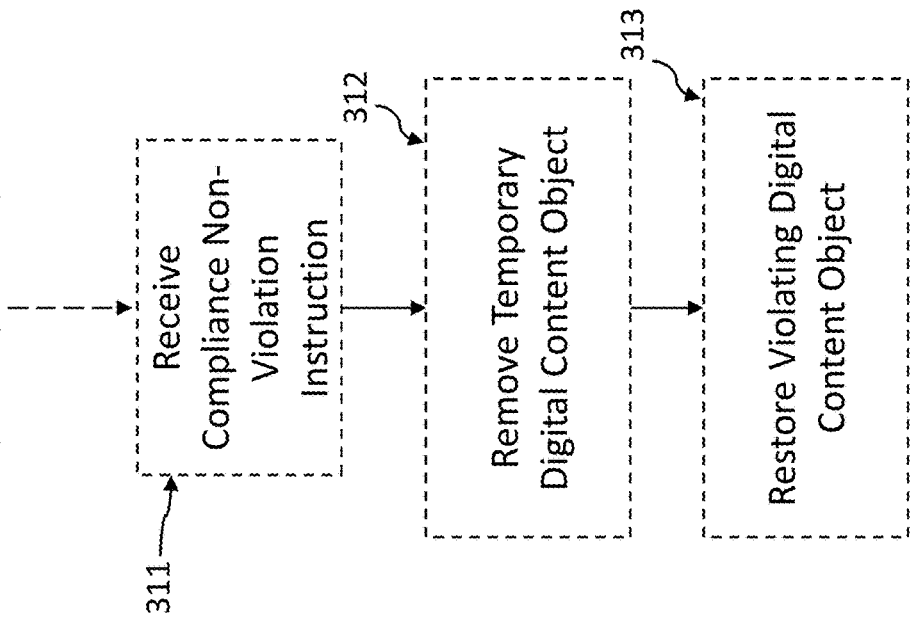
Figure 4A:
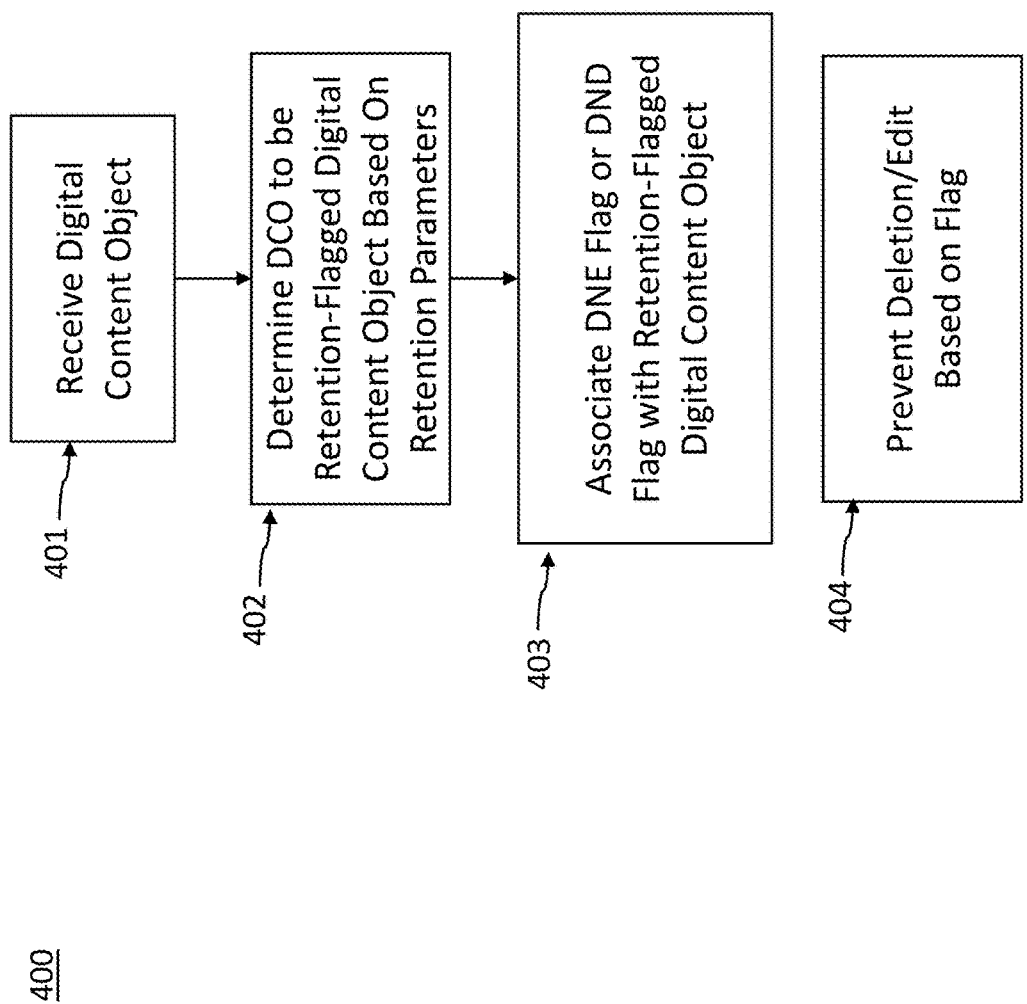
Figure 4B:
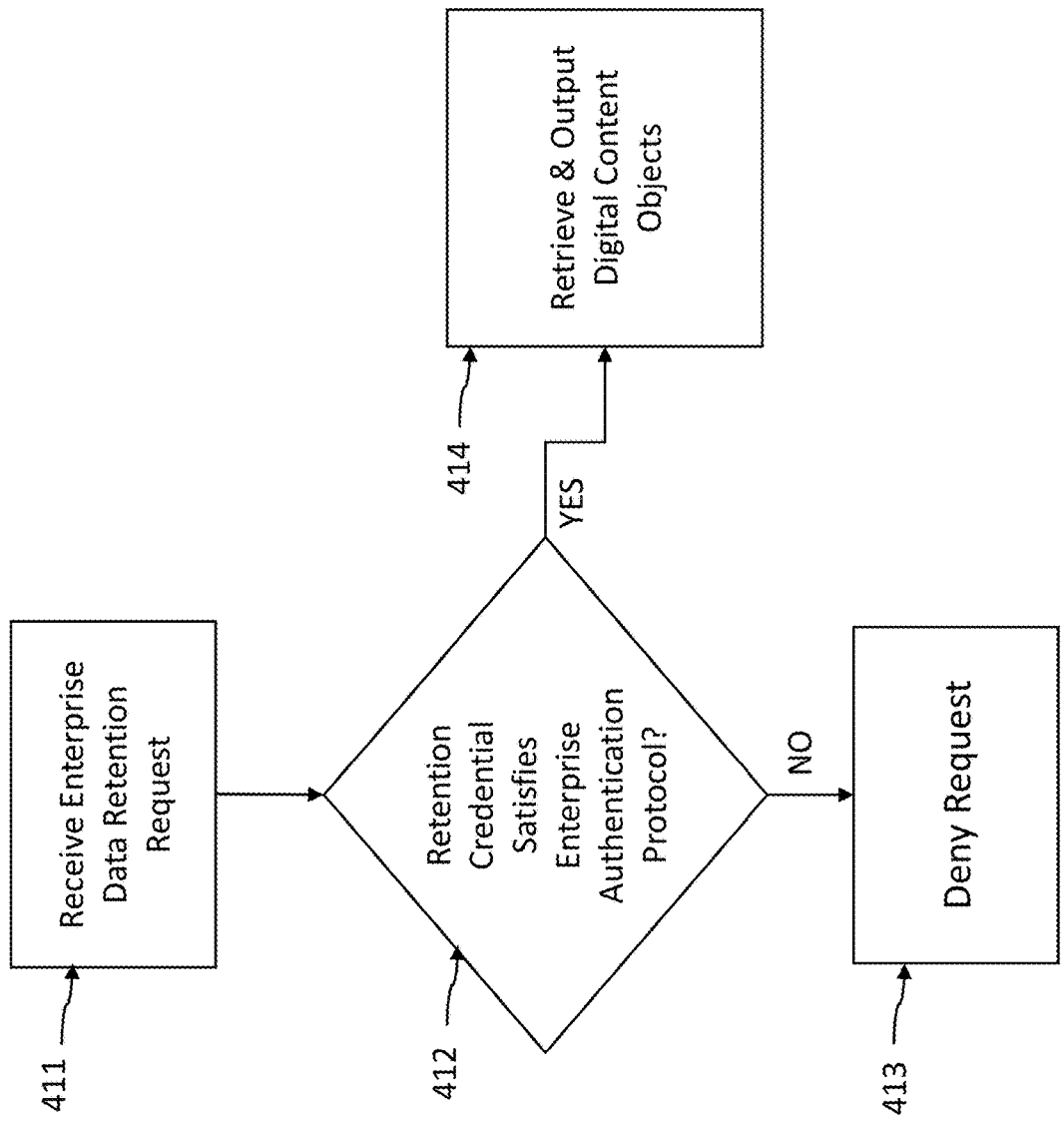

Having thus described the disclosure in general terms, reference will now be made to the accompanying drawings, which are not necessarily drawn to scale, and wherein:

FIG. 1 is a system architecture diagram of a group based communication system configured to practice embodiments of the present disclosure;

FIG. 2 is an exemplary schematic diagram of a computing entity according to one embodiment of the present disclosure;

FIG. 3A illustrates an exemplary content auditing data flow according to one embodiment of the present disclosure;

FIG. 3B illustrates an exemplary content auditing data flow according to one embodiment of the present disclosure; and FIG. 4A illustrates an exemplary content retention data flow according to one embodiment of the present disclosure;

FIG. 4B illustrates an exemplary data retention request flow according to one embodiment of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to a group based communication repository comprising a plurality of enterprise-based digital content objects organized among a plurality of group-based communication channels (e.g., an engineering channel, a marketing channel, a sales channel, an executives channel, an accounting channel, a legal channel, etc.). Prevention of loss of digital content objects (also may be referred to as data loss prevention) include security measures taken in enterprise systems to ensure confidential and risky data or digital content objects are not transmitted outside of enterprise firewalls. Auditing of digital content objects also include security measures taken in enterprise systems to ensure compliance of stored data. Digital content objects stored within the group based communication repository are audited, and if any digital content objects are found to violate system governance risk and compliance rules (also referred to herein as compliance or compliance rule) those violating digital content objects are quarantined and may ultimately be deleted from the group based communication repository or appropriately redacted. Further, digital content objects that may be in violation of compliance rules are prevented from being transmitted outside of enterprise firewalls by review upon attempted transmission.

Auditing and retention flagging of digital content objects requires a tedious and thorough review of each and every digital content object stored in a group based communication repository. The inventors have identified that the system resources and time allocated to such reviews within the context of a group-based communication system are easily exhausted and compromised as a result of the complex design and storage needs of a group-based communication system.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "digital content auditing" refers to a review of stored digital content objects. An audit of digital content objects may involve applying a set of compliance rules to the stored digital content objects to evaluate whether any of the stored digital content objects violate and compliance rules.

The term "group-based communication repository" refers to one or more repositories or databases in which digital content objects are stored. A group-based communication repository may comprise a single database or multiple databases, and may be part of or separate from a group-based communication server.

The term "enterprise-based digital content objects" refers to digital content objects associated with an enterprise ("enterprise-based digital content objects" and "digital content objects" are used herein interchangeably). For example, an enterprise-based digital content object may be a message or file posted to a group-based communication channel associated with an engineering team of an enterprise.

The term "enterprise audit request" refers to instructions comprising a request to perform an audit of enterprise-based digital content objects stored in a group based communication repository. The audit may be, for example, to evaluate whether digital content objects stored in the group based communication repository meet certain compliance rules.

The term "audit credential" refers to an authentication token received from a requesting service, the audit credential representing whether or not the requesting service is allowed to issue an enterprise audit request. For example, an audit credential may comprise a token, an email address, a unique identifier, or other authenticating data object.

The term "digital content object retrieval parameter" refers to options specified in a digital object retrieval request. Examples of parameters include group-based communication channel identifiers, group-based communication group identifiers, a date, a timestamp, a message flag, a file flag, and the like.

The term "enterprise authentication protocol" refers to any authentication protocol employed by an enterprise system to confirm the identity of an entity accessing the group based communication system. Examples of enterprise authentication protocols include OAuth 2.0 and the like.

The terms "compliance rules" or "compliance rule" refer to any set of rules for digital content objects within a group based communication repository. For example, compliance rules may require digital content objects to meet certain confidentiality criteria, privacy criteria, financial industry regulatory authority (FINRA) criteria, health insurance portability and accountability (HIPAA) criteria, and the like.

The term "violating digital content object" refers to a digital content object that has been identified, upon initial evaluation, as violating any compliance rules.

The term "violating digital content object identifier" refers to an identifier for a digital content object that is in violation of compliance rules. For example, the identifier may comprise ASCII text, a pointer, a memory address, and the like.

The term "compliance violation instruction" refers to electronic instructions indicating that a violating digital content object is confirmed, upon additional review, to be in violation of any compliance rule.

The term "temporary digital content object" refers to a digital content object (e.g., message or file) that contains generic compliant content for temporarily replacing a violating digital content object in the channel in which the violating digital content object was located.

The term "permanent replacement digital content object" refers to digital content object (e.g., message or file) that contains generic compliant content for permanently replacing a violating digital content object, upon confirmation that the digital content object was indeed in violation of a compliance rule, in the channel in which a temporary digital content object was holding the place of the violating digital content object.

The term "secondary digital content objects" refers to any additional reactionary digital content objects that are associated with a violating digital content object. For example, a digital content object (e.g., a message) may have been posted in response to the violating digital content object. As another example, a digital content object (e.g., an emoji reaction) may have been posted in response to the violating digital content object. The message and emoji reaction are examples of secondary digital content objects, as they are associated with the violating digital content object.

The term "deletion notification" refers to a digital indication or notification that a digital content object has been deleted. For example, a deletion notification may comprise a text message, an email, a pop-up notification, or some combination of one or more of text, audio, or video content sufficient to display on a client device a conveyance of removal of a digital content object from a group-based communication channel.

The term "author" refers to a user or client device that originated or created a digital content object. For example, an author is identified as the user responsible for the creation of a message that was posted to a group-based communication channel.

The term "digital content retention" refers to enterprise efforts to retain all digital content objects that have been posted to group-based communication channels.

The term "enterprise data retention request" or "retention request" refers to instructions comprising a request to review enterprise-based digital content objects stored in a group based communication repository. The review may be, for example, to evaluate which digital content objects should be flagged for retention.

The term "retention credential" refers to refers to an authentication token received from a requesting service, the audit credential representing whether or not the requesting service is allowed to issue an enterprise data retention request. For example, a retention credential may comprise a token, an email address, a unique identifier, or other authenticating data object.

The terms "digital content object retention parameters" and "digital content object retention criteria" refer to options associated with a digital content object that control retention of the digital content object. Examples of retention parameters include retention parameters for messages and retention parameters for files. Examples of the retention parameters for messages comprise do not edit, do not delete, or allow edits and deletion up until the expiration of a time window. Examples of the retention parameters for files comprise do not edit.

The term "retention-flagged digital content object" refers to a digital content object that has been identified as subject to a retention policy.

The term "retention-flagged digital content object identifier" refers to an identifier for a digital content object that has been selected as subject to a retention policy. For example, the identifier may comprise ASCII text, a pointer, a memory address, and the like.

The term "do not delete flag" refers to data or an identifier associated with a digital content object comprising an instruction to not delete the digital content object. For example, when a digital content object has a do not delete flag associated with it, the group based communication server will prevent the digital content object from being deleted or otherwise removed from the group based communication repository.

The term "do not edit flag" refers to data or an identifier associated with a digital content object comprising an instruction to not edit the digital content object. For example, when a digital content object has a do not edit flag associated with it, the group based communication server will prevent the digital content object from being changed or modified in any way (i.e., a user will not be able to create additional versions of the digital content object, nor will any additional versions of the digital content object be stored in the group based communication repository).

The term "newly submitted digital content item" refers to a digital content item that has been posted to a group-based communication channel since a timestamp of a most recent run of a digital content audit or retention connection or request.

The term "automatic" or "automatically" refers to any step or steps of an electronic process or processes that takes place without interaction by an outside entity. For example, upon receiving a particular input, a group based communication server may automatically transmit a message to a specific client device. Such message will be transmitted by the group based communication server without requiring any intermediate input by a user or other device.

The term "electronically notify" refers to an electronic transmission of data indicative of a notification. For example, an electronic notification may comprise a text message, an email, a pop-up notification, or some combination of one or more of text, audio, or video content sufficient to display on a client device a conveyance of a notification.

The term "network time" refers to timestamps defined by a computer, server, or communications network. A timestamp is a sequence of characters or encoded information identifying when a certain event occurred, usually giving date and time of day, sometimes accurate to a small fraction of a second. For example, a digital content object may comprise a timestamp that indicates when it was created or last modified.

The term "expiration" refers to an end of a defined period or duration of network time. The term "edit window" refers to a duration of time during which a digital content object may be edited or somehow altered, usually beginning at the time of creation of the digital content object. For example, an edit window may be defined as 1 minute, 5 minutes, 10 minutes, etc. At the end of 1 minute, 5 minutes, 10 minutes, etc. from the network timestamp associated with when a digital content object was created, the edit window will expire and the digital content object may no longer be edited.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
Apple WebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2 </client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
        <client_product_type>MacPro5,1</client_product_type>
        <client serial_number>YXXXXXXXXZ</client_serial_number>
        <client_UDID>FXXXXXXXX-XXXX-XXXX-XXXX-
```

```
XXXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our patent
policy.</contents>
        <attachments>patent_policy.pdf</attachments>
    </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy
    our patent policy.</contents>
    <attachments>patent_policy.pdf</attachments>
    <conversation_primitive>
        conversation includes messages: ID_message_8,
        ID_message_9, ID_message_10,
        ID_message_11, ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:
  SELECT messageResponses
  FROM MSM_Message
  WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The server 106 may be embodied by one or more computing systems, such as apparatus 200 shown in FIG. 2. The apparatus 200 may include a processor 202, a memory 201, input/output circuitry 203, communications circuitry 205, group-based communication repository 107 and group-based communication circuitry 204. The apparatus 200 may be configured to execute the operations described above with respect to FIG. 1 and below with respect to FIGS. 3-4. Although these components 107 and 201-205 are described with respect to functional limitations, it should be understood that the particular implementations necessarily include the use of particular hardware. It should also be understood that certain of these components 107 and 201-205 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor, Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Audit and Retention of Enterprise-Based Digital Content Objects An application programming interface (API) is a set of subroutine definitions, protocols, and tools for building application software. In general terms, it is a set of clearly defined methods of communication between various software components. An API may be for a web-based system, operating system, database system, computer hardware or software library, or transmitting data to and from a group-based communication system. An API specification can include specifications for routines, data structures, object classes, variables or remote calls. POSIX, Microsoft Windows API, the C++ Standard Template Library and Java APIs are examples of different forms of APIs.

In embodiments, the present group-based communication system receives enterprise audit requests by way of an API and transmits data comprising digital content objects by way of the API. The inventors have discovered that the use of APIs for the present disclosure provides several benefits when compared to the use of proxies. Proxies, in contrast to APIs, rely upon known endpoint network traffic. Such reliance makes it impossible to monitor traffic to and from guests within the group-based communication system. Such reliance also prevents decryption of all traffic (e.g., when the group-based communication system may pin certificates to a desktop or mobile client device). An implementation relying upon proxies also prevents monitoring of all mobile device network traffic.

What's more, proxies deal exclusively with "in-line" data. Such a feature removes all context about communication (e.g., it is not possible if the audience for contents are is a set of approved group or channel members or to external users/guests).

Finally, a proxy based solution provides unacceptably poor performance. The present system overcomes all of the above shortcomings and more.

FIG. 3A illustrates an exemplary content auditing data flow according to one embodiment of the present disclosure. The method 300 begins with receiving an enterprise audit request 301. In some embodiments, the enterprise audit request may comprise an audit credential and digital content object retrieval parameters.

The method 300 continues with evaluating whether the audit credential satisfies an enterprise authentication protocol 302. If the audit credential does not satisfy the enterprise authentication protocol 302, the enterprise audit request is denied 303. In circumstances where the audit credential satisfies the enterprise authentication protocol 302, the method 300 proceeds and digital content objects are retrieved and output based upon the digital content object retrieval parameters 304. In some embodiments, the digital content object retrieval parameters may comprise a group-based communication channel identifier. In some embodiments, the digital content object retrieval parameters may comprise a group-based communication group identifier. In some embodiments, the digital content object retrieval parameters may comprise a flag indicating that only those digital content objects that are files should be returned as results, or indicating that only those digital content objects that are messages should be returned as results.

The method 300 continues with receiving a violating digital content object identifier 305 and replacing the violating digital content object with a temporary digital content object 306.

In embodiments, replacing the violating digital content object with a temporary digital content object 306 comprises removing a file from the group based communication channel and replacing it with a temporary file. The removed file has an identifier appended to it indicating that it is a violating digital content object. In embodiments, replacing the violating digital content object with a temporary digital content object 306 comprises updating contents of a message by deleting the contents such that the message still is displayed but the contents do not display in the group based communication channel.

Shown in dashed lines and boxes, the method 300 may optionally continue to receiving a compliance violation instruction 307 and replacing the temporary digital content object with a permanent replacement digital content object 308. Any secondary digital content objects associated with the violating digital content object are deleted from their respective group-based communication channel 309. Deletion notifications are transmitted to the author(s) of the violating digital content object as well as those of the secondary digital contents 310.

In embodiments, replacing the temporary digital content object with a permanent replacement digital content object 308 comprises deleting a temporary file from the group based communication channel that had been placed in the group based communication channel. In embodiments, replacing the temporary digital content object with a permanent replacement digital content object 308 comprises deleting a message from the group based communication channel such that the message does not display in the group based communication channel.

Also shown in a heavier dashed line, the method 300 may continue directly from receiving the violating digital content object identifier 305 to replacing the violating digital content object with a permanent replacement digital content object 308. Any secondary digital content objects associated with the violating digital content object are deleted from their respective group-based communication channel 309. Deletion notifications are transmitted to the author(s) of the violating digital content object as well as those of the secondary digital contents 310.

FIG. 3B illustrates an exemplary content auditing data flow according to one embodiment of the present disclosure. Also shown in dashed lines and boxes, the method 300 may proceed after 306 to method 320 of FIG. 3B. Method 320 continues with receiving a compliance non-violation instruction 311. In such an embodiment, the temporary digital content object is removed from the group-based communication channel 312 and the violating digital content object is restored to the group-based communication channel 313.

In some embodiments of FIGS. 3A and 3B, the violating digital content object is moved to a private group-based communication channel for violating digital content objects.

In embodiments, restoring the violating digital content object to the group based communication channel 313 comprises restoring a file to the group based communication channel. In embodiments, restoring the violating digital content object to the group based communication channel 313 comprises placing the original message contents back into a message such that the original message and contents display in the group based communication channel.

In some embodiments of FIGS. 3A and 3B, when a connection is opened such that an enterprise audit request is received and, in circumstances where the audit credential satisfies the enterprise authentication protocol, the most recently transmitted digital content objects are continuously retrieved and output based on the digital content object retrieval parameters so long as the connection is still open. It will be appreciated that this embodiment is a scalable introduction to those depicted in FIGS. 3A and 3B, and that other functionalities described herein are applicable.

FIG. 4A illustrates an exemplary content retention data flow according to one embodiment of the present disclosure. The method 400 begins with receiving a digital content object 401. In embodiments, the digital content object is a message transmitted for rendering in a group based communication channel by a client device.

The method 400 continues with determining that the digital content object (DCO) should be a retention-flagged digital content object based upon digital content object retention parameters. In embodiments, digital content object retention parameters are different for files and messages. For example, digital content object retention parameters for files comprise a blocking of edits to the files (e.g., do not edit), while digital content object parameters for messages comprise one or more of a blocking of edits to the message, a blocking of deletion of the message, or an allowance of edits to and/or deletion of the message up to a certain network timestamp subsequent the original transmission of the message for rendering in the group based communication channel.

The method 400 continues with associating the appropriate do-not-edit (DNE) or do-not-delete (DND) flag with the retention-flagged digital content object 403, and preventing deletion or editing of the retention-flagged digital content object based on the associated flag 404. In some embodiments, a client device is prevented from making changes to a retention-flagged digital content object that is associated with the do not edit flag after expiration of an edit window, where the edit window is a duration of network time starting from a creation of the retention-flagged digital content object (e.g., 1 minute, 5 minutes, etc.).

FIG. 4B illustrates an exemplary data retention request flow according to one embodiment of the present disclosure.

A method 450 begins with receiving an enterprise data retention request 411. In some embodiments, the enterprise audit request may comprise a retention credential and digital content object retrieval parameters.

The method 450 continues with evaluating whether the retention credential satisfies an enterprise authentication protocol 412. If the retention credential does not satisfy the enterprise authentication protocol 412, the retention request is denied 413. In circumstances where the retention credential satisfies the enterprise authentication protocol 412, the method 450 proceeds and digital content objects are retrieved and output based upon the digital content object retrieval parameters 414. In some embodiments, the digital content object retrieval parameters may comprise a group-based communication channel identifier. In some embodiments, the digital content object retrieval parameters may comprise a group identifier. In some embodiments, the digital content object retrieval parameters may comprise a flag indicating that only those digital content objects that are files should be returned as results, or indicating that only those digital content objects that are messages should be returned as results. In some embodiments, the digital content retrieval parameters may comprise a date and time such that only those digital content objects having a creation timestamp associated therewith that is after one or more of the date and time should be returned as results.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for digital content auditing of a group-based communication repository, the apparatus comprising at least one processor and at least one memory including computer program code, the at least one memory and the computer program code configured to, with the at least one processor, cause the apparatus to:

receive an enterprise audit request, the enterprise audit request comprising a request for digital content auditing of a group-based communication repository, the group-based communication repository comprising a plurality of digital content objects organized among a plurality of group-based communication channels, the enterprise audit request comprising an audit credential and digital content object retrieval parameters; and upon determining that the audit credential satisfies an enterprise authentication protocol, retrieve and transmit for display digital content objects associated with the digital content object retrieval parameters;

receive a violating digital content object identifier; and replace a violating digital content object associated with the violating digital content object identifier with a temporary digital content object in the group-based communication repository.

2. The apparatus of claim 1, further caused to:

in response to receiving a compliance violation instruction, replace the temporary digital content object with a permanent replacement digital content object in the group-based communication repository;

delete any secondary digital content objects associated with the violating digital content object from the group-based communication repository; and transmit deletion notifications to a violating digital content object author and any authors of the secondary digital content objects.

3. The apparatus of claim 1, further caused to:

in response to receiving a compliance non-violation instruction, remove the temporary digital content object from the group-based communication repository; and restore the violating digital content object to the group-based communication repository.

4. The apparatus of claim 1, wherein the retrieval parameters comprise a group-based communication channel identifier.

5. The apparatus of claim 4, wherein only those digital content objects stored in the group-based communication repository that are associated with the group-based communication channel identifier are retrieved and transmitted for display.

6. The apparatus of claim 1, wherein the retrieval parameters comprise a group identifier.

7. The apparatus of claim 6, wherein only those digital content objects associated with the group identifier are retrieved and transmitted for display.

8. The apparatus of claim 1, wherein the violating digital content object is moved to a private group-based communication channel for violating digital content objects.

9. The apparatus of claim 1, wherein the retrieval parameters comprise a filter flag, wherein the filter flag is one or more of date, time, files, messages, or all.

10. An apparatus for digital content retention in a group-based communication repository, the apparatus comprising at least one processor and at least one memory including computer program code, the at least one memory and the computer program code configured to, with the at least one processor, cause the apparatus to:

receive a digital content object from a client device, the digital content object for storing in the group-based communication repository, the group-based communication repository comprising a plurality of digital content object objects organized among a plurality of group-based communication channels;

identify the digital content object as a retention-flagged digital content object based on digital content object retention parameters; and associate one or more of a do not edit (DNE) or do not delete (DND) flag with the retention-flagged digital content object;

wherein the client device is prevented from deleting a retention-flagged digital content object that is associated with a do not delete (DND) flag; and wherein the client device is prevented from making changes to a retention-flagged digital content object that is associated with the do not edit (DNE) flag.

11. The apparatus of claim 10, further caused to:
receive an enterprise data retention request, the enterprise data retention request comprising a retention credential and digital content object retrieval criteria; and
upon determining that the retention credential satisfies an enterprise authentication protocol,
retrieve and transmit for display those digital content objects stored within the group-based communication repository based on the digital content object retrieval criteria.

12. The apparatus of claim 10, further caused to:
monitor the group-based communication repository for newly submitted digital content objects that match the digital content object retrieval criteria.

13. The apparatus of claim 10, wherein the client device is prevented from making changes to a retention-flagged digital content object that is associated with the do not edit flag after expiration of an edit window, wherein the edit window is a duration of network time starting from a creation of the retention-flagged digital content object.

14. The apparatus of claim 10, wherein the digital content object retrieval criteria comprises a group-based communication channel identifier.

15. The apparatus of claim 10, wherein the digital content object retrieval criteria comprises a group-based communication group identifier.

16. The apparatus of claim 10, wherein the digital content object retrieval criteria comprises a filter flag, wherein the filter flag is one or more of date, time, files, messages, or all.

17. The apparatus of claim 1, wherein a group-based communication channel comprises a virtual communications feed configured to display messaging communications posted by channel members that are viewable only to the channel members.

18. The apparatus of claim 1, wherein a violating digital content object identifier is associated with a digital content object in violation of one or more compliance rules.

19. The apparatus of claim 18, wherein a compliance rule is one or more of a rule requiring that a digital content object meet certain confidentiality criteria, a rule requiring that a digital content object meet certain financial industry regulatory authority (FINRA) criteria, or a rule requiring that a digital content object meet health insurance portability and accountability (HIPAA) criteria.

20. The apparatus of claim 14, wherein a group-based communication channel comprises a virtual communications feed configured to display messaging communications posted by channel members that are viewable only to the channel members.

21. The apparatus of claim 11, wherein an enterprise data retention request comprises a request to evaluate which digital content objects should be flagged for retention.

22. The apparatus of claim 17, wherein a digital content object comprises a messaging communication.

23. The apparatus of claim 20, wherein a digital content object comprises a messaging communication.

\* \* \* \* \*